United States Patent [19]

Heidecker et al.

[11] 4,228,763
[45] Oct. 21, 1980

[54] MILKING UNIT SUPPORT AND DETACHER MECHANISM

[75] Inventors: Robert F. Heidecker; Edward D. Harwood, both of Longmont, Colo.

[73] Assignee: Dairy Systems, Inc., Longmont, Colo.

[21] Appl. No.: 902,354

[22] Filed: May 3, 1978

[51] Int. Cl.³ .................. A01J 5/04; A01J 7/00
[52] U.S. Cl. .................. 119/14.08; 119/14.1; 119/14.13
[58] Field of Search ............ 119/14.08, 14.21, 14.1, 119/14.11, 14.13, 14.14, 14.45

[56] References Cited
U.S. PATENT DOCUMENTS

| | | | |
|---|---|---|---|
| 3,033,161 | 5/1962 | Babson | 119/14.13 |
| 3,556,053 | 1/1971 | Padman | 119/14.08 |
| 3,603,292 | 9/1971 | Finch | 119/14.1 |
| 3,690,300 | 9/1972 | Tonelli | 119/14.08 |
| 3,789,798 | 2/1974 | Reisgios et al. | 119/14.08 |
| 3,814,056 | 6/1974 | Machans | 119/14.08 |
| 3,861,355 | 1/1975 | Johnson et al. | 119/14.08 |
| 3,893,422 | 7/1975 | Schnitzler et al. | 119/14.08 |
| 3,929,103 | 12/1975 | Schluckbier | 119/14.08 |
| 3,938,470 | 2/1976 | Pace | 119/14.1 |
| 3,973,520 | 8/1976 | Flocchini | 119/14.08 |

Primary Examiner—Hugh R. Chamblee
Attorney, Agent, or Firm—John E. Reilly

[57] ABSTRACT

A milking unit support and detacher mechanism for supporting a milking unit when the milking unit is attached to a cow for milking. The milking unit support and detacher mechanism includes a milking unit support arm movable between a first position wherein the arm extends outwardly for supporting a milking unit when the milking unit is attached to a cow for milking. The milking unit support and detacher mechanism also includes means for supporting the milking unit support arm for movement between the first position and the second position, and means for retracting the milking unit and for moving the milking unit support arm from the second position to the first position, the retracting means including a flexible retracting member connected to the milking unit, and means for pulling on the flexible retracting member.

18 Claims, 9 Drawing Figures

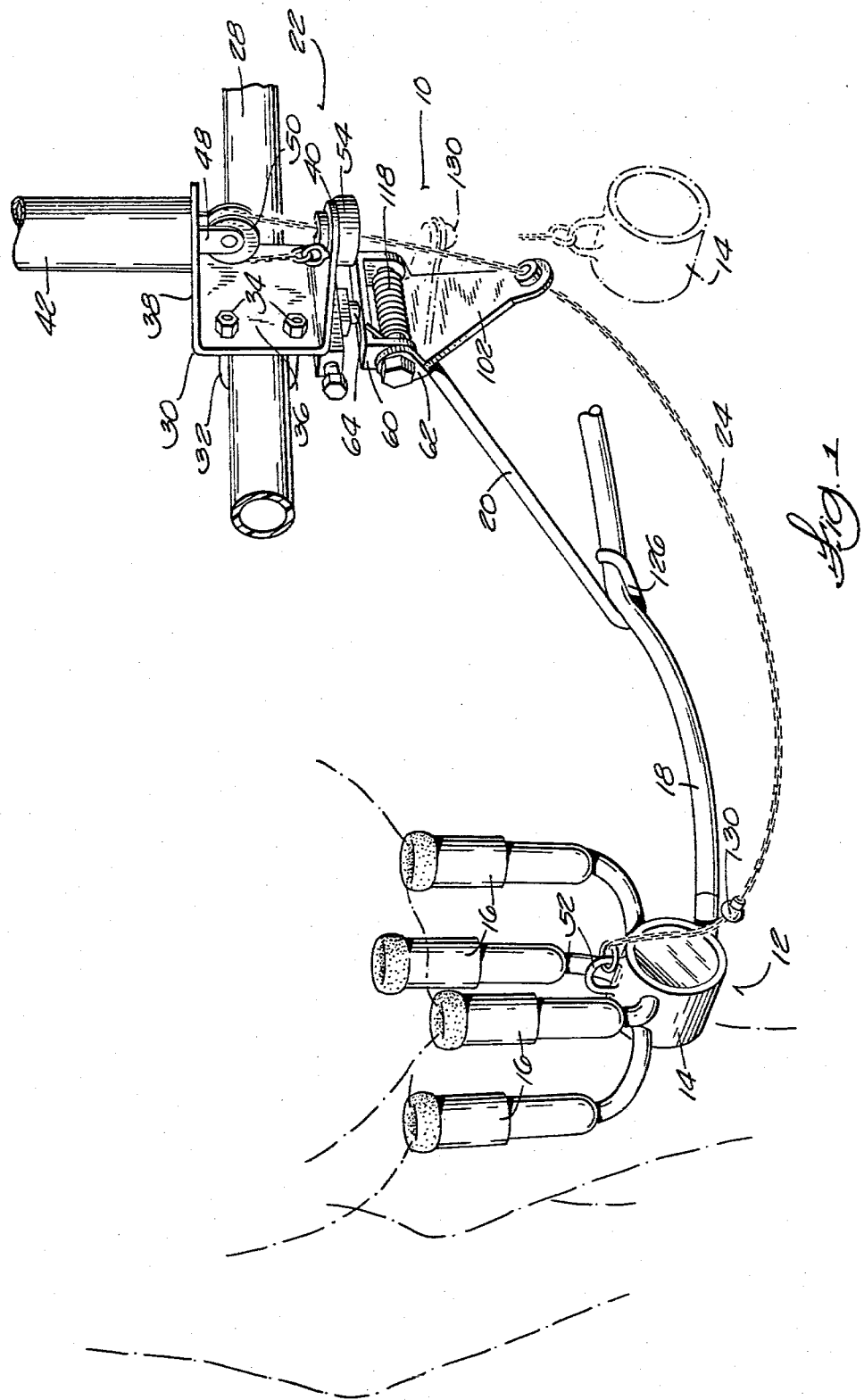

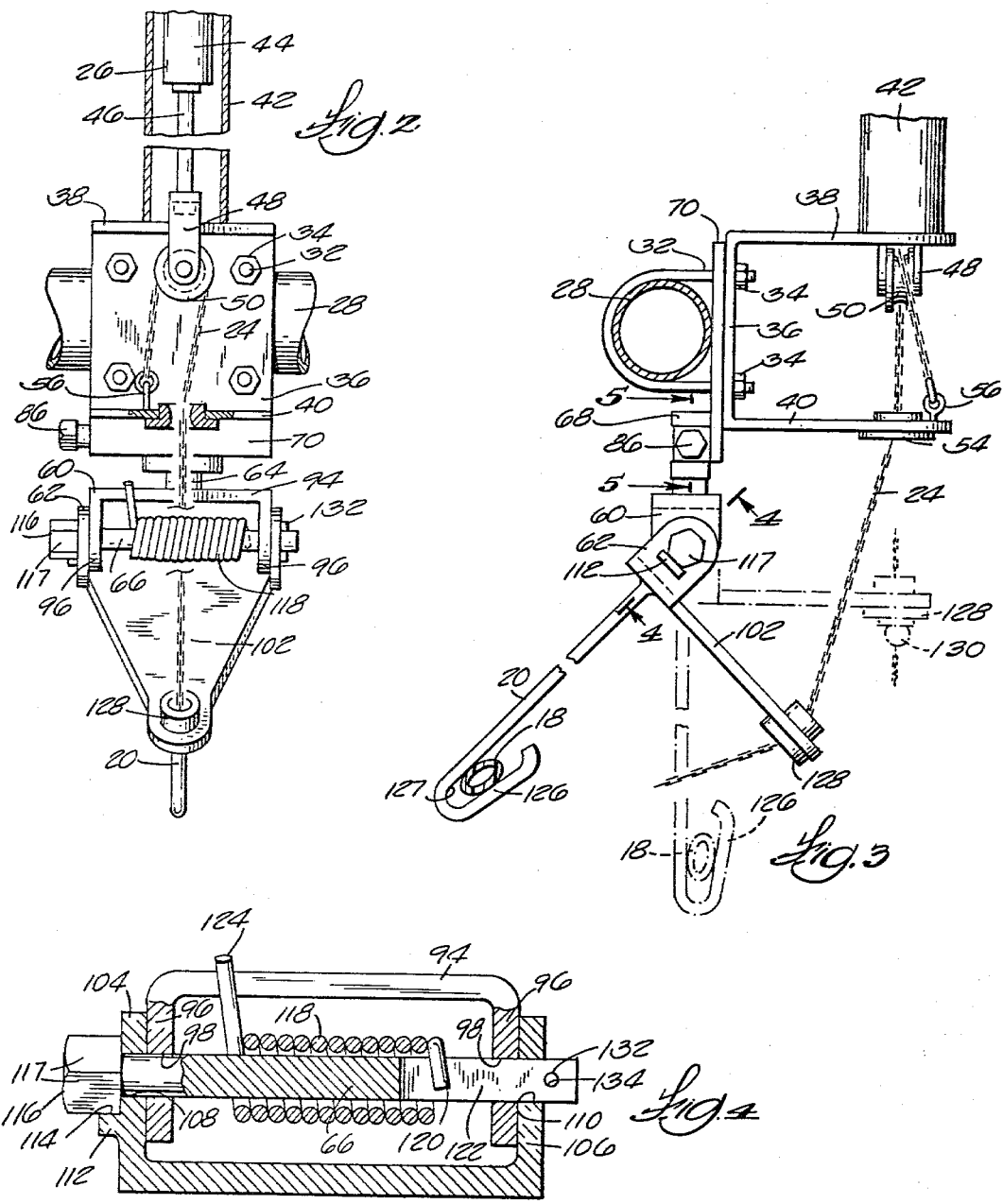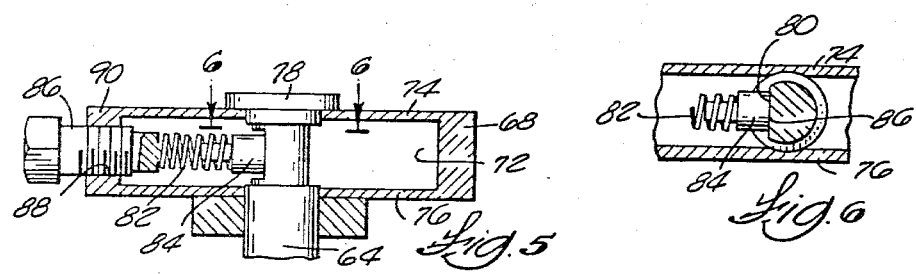

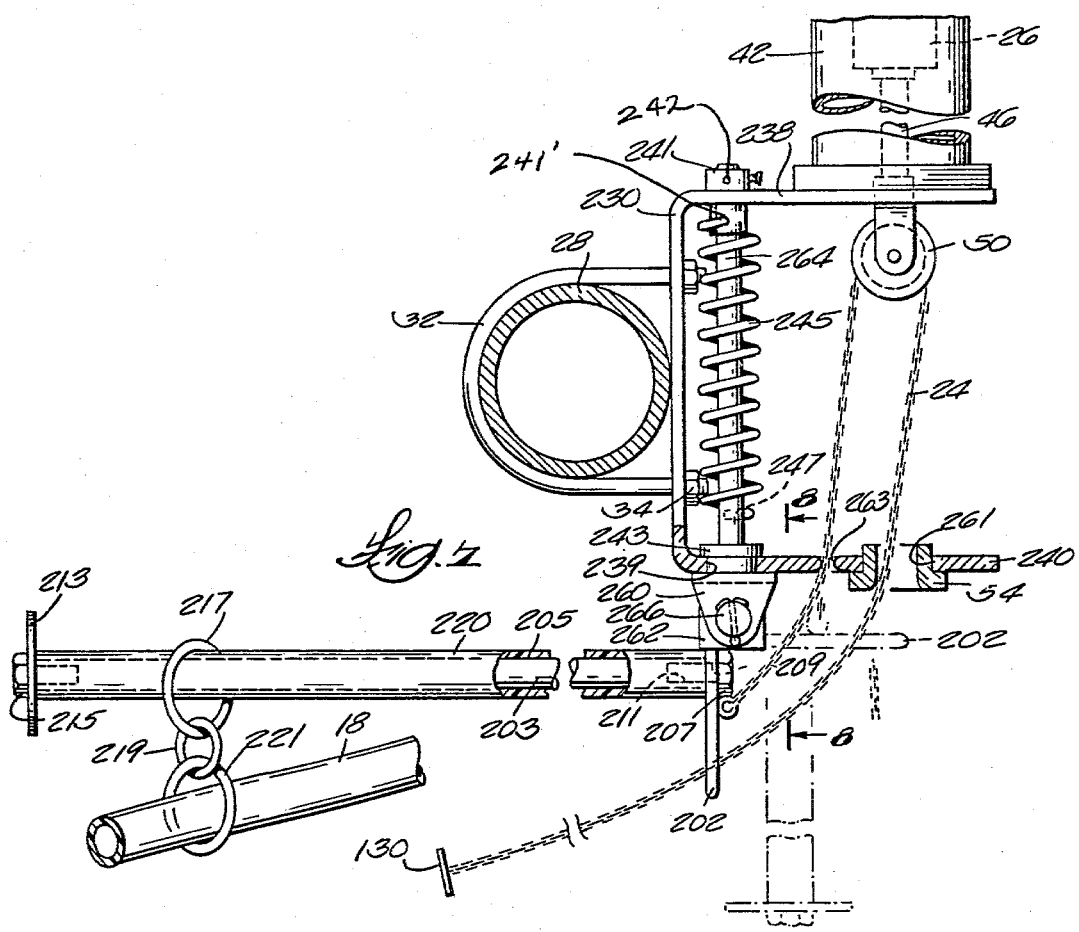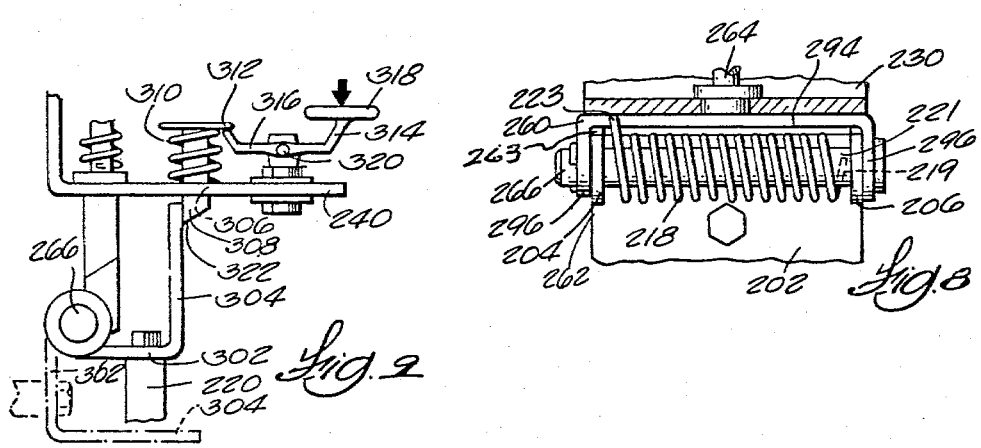

MILKING UNIT SUPPORT AND DETACHER MECHANISM

CROSS REFERENCE TO RELATED APPLICATION

Reference is made to patent application Ser. No. 902,355, filed May 3, 1978, by Carl E. Plett.

BACKGROUND OF THE INVENTION

1. Field of the Invention

This invention relates to a milking support and detacher mechanism and more particularly to a mechanism which is intended to move to a milking unit supporting position at the beginning of the milking cycle and is retractable upon completion of the milking cycle. The milking unit support and detacher mechanism also includes means for automatically retracting the milking unit from underneath the cow and raising it to a higher position and means for retracting the milking unit support arm.

2. Description of the Prior Art

Prior mechanisms of the general type known to applicants are shown in U.S. Pat. Nos. 3,246,613; 3,556,053; 3,603,292; 3,690,300; 3,033,161; 3,789,798; 3,861,355; 3,938,470; 3,814,056 and 3,893,422. One of the principal problems related to the prior art mechanisms has been the relative complexity of such mechanisms resulting in generally higher cost and in some instances lower reliability. Another problem related to the prior art apparatus is that such apparatus commonly requires the operator to manually move the milking unit support apparatus into a milking unit supporting position at the beginning of the milking cycle.

SUMMARY OF THE INVENTION

The present invention provides a milking unit support and detacher mechanism for supporting a milking unit and the hoses therefor when the milking unit is attached to a cow for milking and including a milking unit support arm movable between a first position wherein the arm extends downwardly and a second position wherein the arm extends outwardly. The milking unit support arm has an end for supporting the milker unit hoses and positioning the milker unit in connected relation to a cow. The support and detacher mechanism also includes means for supporting the milking unit support arm for movement between the first position and the second position.

In accordance with one embodiment of the invention, the milking unit support and detacher mechanism further includes means for retracting the milking unit and for moving the milking unit support arm from the second position to the first position, the means for retracting including a flexible retracting member connected to the milking unit, and the retracting means including means for pulling on the flexible retracting member.

In accordance with one embodiment of the invention, the means for pulling on the flexible retractable member includes a fluid motor having a vertically movable piston and means for connecting the piston to the flexible retracting member.

One of the principal features of the invention is the provision of means for supporting the hoses of a milker unit while lending a floating support to the unit itself which is compact and efficient, permits automatic or manual retraction with automatic positioning of the hose when the milker unit or claw is attached; and further wherein the entire unit is safe and dependable to use.

Another of the principal features of the invention is the provision of means for biasing the support arm forwardly when the support arm is in a rearward position.

Another of the principal features of the invention is the provision of a lever arm having opposite ends, one of the lever arm ends connected to the support arm, and means attached to the flexible retracting member for engaging the other end of the lever arm when the flexible retracting member is retracted so as to pivot the lever arm and the support arm to the first position.

Moreover, the milking unit support arm is supported on a vertical shaft, a first bracket supported by the shaft for rotation about a vertical axis, a generally horizontal pivot shaft supported by the first bracket and having a generally horizontal axis, and a second bracket supported by the horizontal shaft for pivotal movement about the generally horizontal axis, and wherein the milking unit support arm is attached to one of the brackets for movement about the vertical axis and the horizontal axis.

BRIEF DESCRIPTION OF THE DRAWINGS

FIG. 1 is a perspective view of a milking unit and a milking unit support and detacher mechanism embodying the invention;

FIG. 2 is a side elevation view of the milking unit support and detacher mechanism shown in FIG. 1;

FIG. 3 is an end elevation view of the milking unit support and detacher mechanism shown in FIG. 1;

FIG. 4 is a cross-section view taken along line 4—4 in FIG. 3;

FIG. 5 is a cross-section view taken along line 5—5 in FIG. 3;

FIG. 6 is a cross-section view taken along line 6—6 in FIG. 5;

FIG. 7 is a view similar to FIG. 3 but showing an alternate embodiment of the invention;

FIG. 8 is a cross-section view taken generally along line 8—8 in FIG. 7; and

FIG. 9 is a partial elevation view similar to FIG. 7 but showing another alternative embodiment of the invention.

DETAILED DESCRIPTION OF ONE EMBODIMENT

Referring to FIG. 1, the milking unit support and detacher mechanism which is indicated generally by reference numeral 10 is adapted to be used with a milking unit apparatus 12 of any suitable design. The milking unit apparatus 12 shown in FIG. 1 is comprised of a claw unit 14, a plurality of teat cups 16 and a milk line 18.

The milking unit support and detacher mechanism 10 generally comprises a retractable milker unit support arm 20 and a retracting assembly 22 which includes a flexible retracting member 24, shown in FIGS. 1–3 as a chain, and having one end attached to the claw 14 of the milking unit 12. The retracting assembly 22 further includes a fluid motor 26 attached to the other end of the flexible retractable member 24 for retracting the milking unit 12.

The fluid motor 26 is generally supported by the rump rail 28. More particularly, a U-shaped support bracket 30 is attached to the rump rail 28 by a pair of U-bolts 32 and nuts 34. The U-shaped support bracket 30 includes a bight portion 36 oriented generally vertically and rigidly supported adjacent the rump rail 28 and also includes vertically spaced generally parallel bracket arms 38 and 40 extending away from the rump rail 28 and generally perpendicular to the bight portion 36. A cylindrical vertical column 42 is supported by bracket arm 38 and houses the fluid motor 26 therein in vertical orientation.

Referring to FIG. 2, the fluid motor 26 generally includes a cylinder 44 and a piston (not shown) having a downwardly extending piston rod 46, the lower end of the piston rod 46 being attached to the chain 24 and operable to cause retraction of chain 24. More specifically, the lower end of piston rod 46 supports a U-shaped bracket 48 which in turn supports a freely rotatable pulley 50.

The chain 24 has one end attached to the claw 14 by a ring 52. The other end of chain 24 extends through an aperture in a chain guide 54 mounted in a bore in the free end of the lower bracket arm 40 of the support bracket 30 and is reeved over the pulley 50 and secured by an eye bolt 56 to the free end of the lower bracket arm 40.

Actuation of the fluid motor 26 to cause upward movement of the piston rod 26 and consequent upward movement of the pulley 50 causes the chain 24 to be retracted and the milking unit 12 to be pulled away from the milking position and upwardly to the position shown in phantom in FIG. 1. It is necessary that the milking unit 12 be pulled upwardly during the retraction process to prevent contact of the teat cups 16 with the ground.

Though the retracting means described includes a fluid motor with a movable piston, other types of retraction means could also be used, including, for example, a power driven winch or reel.

The retractable milker unit support arm 20 is supported from the support bracket 30 for pivotal movement about both a horizontal pivot axis and a vertical pivot axis. The support arm 20 is also spring-biased toward its outwardly extending position wherein its free end projects under the cow in a milking unit support position. The milking unit support arm 20 is intended to support the weight of the milk line or hose 18 and to position the milk line beneath the center of the cow so that the milk line 18 does not tend to pull the claw 14 to the side of the cow. More specifically, the retractable support arm 20 is supported by a pair of pivotal brackets 60 and 62, bracket 60 being supported for rotation about a vertical axis by a pivot shaft 64 in turn supported by the rump rail 28. The bracket 62 is joined to the bracket 60 by a horizontal pivot pin 66 and the bracket 62 is rigidly connected to the retractable support arm 20 for supporting the retractable support arm 20 for pivotal movement about the axis of horizontal pivot pin 66.

The vertical pivot shaft 64 is generally supported by a rectangular housing 68 welded or otherwise rigidly attached to the lower end of a vertical plate 70 clampingly supported between the bight portion 36 of the support bracket 30 and the rump rail 28. The rectangular housing includes a central elongated chamber 72 therein and upper and lower generally horizontal walls 74 and 76, the walls 74 and 76 including aligned bores therethrough for receiving the vertical pivot shaft 64. The pivot shaft 64 is supported by an annular collar 78 surrounding its upper end and received against the upper wall 74.

Referring to FIGS. 5 and 6, the portion of the vertical pivot shaft 64 in the chamber 72 includes a vertical planar face 80 and a coil spring 82 biases a cylindrical pin 84 against the planar face 80. The cylindrical pin 84 is housed in chamber 72 and has a longitudinal axis generally perpendicular to the longitudinal axis of the pivot shaft 64. The cylindrical pin 84 has a planar end face 86 intended to mate with the vertical planar face 80 of the pivot shaft 64. The end of the coil spring 82 opposite that received against pin 84 is positioned against an adjustment screw 86 threadably positioned in a threaded bore 88 in an end wall 90 of the housing 68. The pivot shaft 64 is intended to be supported for rotation about its longitudinal axis but is biased toward a neutral position wherein the planar end face 86 of the cylindrical pin 84 is received against planar face 80 of the pivot shaft 64. When the vertical pivot shaft 64 rotates, coil spring 82 is compressed and the face 86 of cylindrical pin 84 applies a force on one side or the other of planar face 80 and applies a torque on pivot pin 64 biasing it toward the neutral position wherein the planar face 86 of pin 84 mates with planar face 80 of pivot shaft 64. As such, the specific form of spring adjustment as illustrated in FIG. 4 as well as the disposition and arrangement of the adjustment screw 86 and spring-loaded pin 84 with respect to the planar face 80 on the pivot shaft 64 forms no part of the present invention but forms the subject of hereinbefore referred to copending application for patent of Carl E. Plett.

The lower end of vertical shaft 64 is rigidly attached to bracket 60 for supporting that bracket for rotation about a vertical axis. The bracket 60 and horizontal pivot pin 66 in turn support the retractable arm support bracket 62 for pivotal movement about a horizontal axis. The bracket 60 includes a horizontal bight portion 94 attached to the pivot shaft 64 and a pair of transverse side walls 96 extending generally downwardly from the bight portion 94. The side walls 96 include aligned bores 98 therethrough for supporting pivot pin 66.

The arm support bracket 62 includes a generally triangular lever arm 102 and a pair of side walls 104 and 106 extending perpendicular from the plane of the triangular lever arm 102 and extending generally upwardly. The side walls 104 and 106 are positioned in adjacent facing relation to the respective side walls 96, and the side walls 104 and 106 include aligned bores 108 and 110, respectively for receiving pivot pin 66. The side wall 104 includes rectangular stop member 112 projecting from its outer surface, the stop member 112 having an upper planar surface 114. The pivot pin 66 includes a hexagonal head 116 having six planar peripheral surfaces 117, one of which is positioned in planar engagement with the upper surface 114 of the stop member 112, the planar engagement of the upper surface 114 and of the planar surfaces 117 preventing relative rotation between pivot pin 66 and bracket 62.

A coil or torsion spring 118 surrounds pivot pin 66 and includes one end 120 thereof positioned in a longitudinal slot 122 in the end of pivot pin 66. The other end of the coil spring 118 includes a radially projecting arm 124 engaging the bight portion 94 of bracket member 90.

The retractable support arm 20 is rigidly attached at one end to an end of lever arm 102 adjacent pivot pin 66, and the support arm 20 extends generally perpendicularly from the lower surface of the lever arm 102. The other end of arm 20 forms a hook 126 defining a space 127 for wedgingly receiving the milk line 18.

The lever arm 102 of bracket 62 includes a free end spaced from pivot pin 66 and having an aperture therethrough supporting a second chain guide 128. The chain 24 is also provided with a stop member 130 attached thereto at the end of the chain closely adjacent the claw 14. The stop member 130 has a diameter larger than the diameter of the aperture 132 in the chain guide 128. Accordingly, in operation, as the fluid motor 26 causes retraction of chain 24, near the end of the retraction cycle, the stop member 130 will engage the chain guide 128, and further retraction of chain 24 will cause pivotal movement of the lever arm 102 and the arm support bracket 62 about pivot pin 66. Pivotal upward arcuate movement of lever arm 102 will cause a consequent downward arcuate retracting movement of the retractable support arm 20 to the position shown in phantom in FIG. 3.

In operation, milking unit apparatus 12 and the fluid motor 26 are controlled by a four-way solenoid operated valve and milk flow control valve of the type specifically described in the Schluckbier U.S. Pat. No. 3,929,103, issued Dec. 30, 1975. To initiate the milking cycle, the operator grasps the claw 14 of the milking apparatus and actuates the fluid motor control means to cause downward movement of the piston rod 46 thereby permitting extension of the chain 24. The stop member 103 thus moves downwardly permitting the torsion spring 118 to automatically swing the retractable support arm 20 outwardly to the position shown in FIGS. 1 and 3 underneath the cow so that the milk line 18 can be positioned generally under the center of the cow. The operator then attaches the teat cups to the cow.

In some cases it is desirable that the claw 14 be pulled forwardly to facilitate milking of the cow. In such circumstances the retractable arm 20 can be pivoted rearwardly and the milk line 18 wedged in the hook 126. The coil spring 82 and the cylindrical member 84 shown in FIGS. 5 and 6 apply a torque on the vertical pivot shaft 64 biasing the retractable support arm 20 forwardly thereby applying a tension on the milk line 18 and pulling the claw 14 forwardly. Though the retractable support arm 20 can apply a tension on the milk line 18, the force on the arm 20 does not prevent relatively free movement of the arm 20 forwardly or rearwardly in the event the cow moves.

In the event the cow were to kick the support arm 20 when the arm is extemded, damage to the milking unit support mechanism is avoided because the support arm 20 is freely rotatable about the axis of the vertical pivot shaft 64 if sufficient force is applied to the arm 20 to overcome the restraining force of the compression spring 82 and the cylindrical pin 84. The operator can then return the arm 20 to the correct position wherein the planar face 86 of pin 84 will be biased against the planar face 80 of the pivot shaft 64.

The vertical position of the retractable support arm 20 can be adjusted by varying the tension of the torsion spring 118. Such adjustment is provided by removing a restraining pin 132 from a bore 134 in the end of the pivot pin 66 thereby permitting the pivot pin 66 to be moved axially to the left as seen in FIG. 4 such that the hexagonal head 116 is free of the stop member 112. The pivot pin 66 can then be rotated to either increase or decrease the tension of the torsion spring 118 and then moved axially such that one of the planar faces 117 is again positioned in planar engagement with the planar surface 114 of the stop member 112 whereby the pivot pin 66 is restrained against rotational movement.

An alternative embodiment of the milking unit support arm and detacher mechanism is shown in FIGS. 7 and 8. The mechanism shown therein is constructed in a similar manner to the device shown in FIGS. 1–6 except that a different retractable support arm 220 is provided and alternative structure is provided for supporting the support arm 220 for movement about horizontal and vertical axes. A further difference is the provision of means for attaching one end of chain 24 to the structure supporting the support arm 220.

The components of the construction shown in FIGS. 7 and 8 which are similar to the construction shown in FIGS. 1–6 are identified with the same reference numerals and, hence, a description of these components in detail is not believed necessary in view of the foregoing description with respect to FIGS. 1–6.

More specifically, with respect to the differences in the construction of the milking unit support and detacher mechanism of FIGS. 7–9, the fluid motor 26 is supported by a U-shaped support bracket 230 attached to the rump rail 28 by a pair of U-bolts 32 (one shown) and nuts 24. The U-shaped support bracket 230 includes a bight portion 236 oriented generally vertically and secured against the rump rail 28 and also includes vertically spaced generally parallel bracket arms 238 and 240 extending away from the rump rail 28 and generally perpendicular to the bight portion 236. The bracket arm 240 supports a cylindrical vertical column 42 and the fluid motor 26 is housed in the column 42.

The retractable milker unit support arm 220 is supported from the support bracket 230 for pivotal movement about both a horizontal pivot axis and a vertical pivot axis. The support arm 220 is also spring biased toward its outwardly extending position shown in solid lines in FIG. 7 wherein its free end is intended to project under a cow in a milking unit support position. More specifically, the retractable support arm 220 is supported by pivotal bracket 260 and and offset arm support bracket 262, pivotal bracket 260 being supported for rotation about a vertical axis by a pivot shaft 264, in turn supported by the support bracket 230. The arm support bracket 262 is supported for relative pivotal movement about a horizontal axis by a horizontal pivot pin 266 in turn supported by bracket 260.

The vertical pivot shaft 264 is supported for rotation about its axis with the upper end of the shaft 264 extending upwardly through a bore in bracket arm 238 and the lower end of shaft 264 extending through a bore 239 in bracket arm 240. The vertical pivot shaft is supported by an annular collar or bushing 241 secured to the upper end of the shaft 264 and resting on the upper surface of bracket arm 238 with a sleeve 241' of reduced diameter extending downwardly from the collar 241 through an opening in the upper end of the bracket 238. The sleeve 241' is provided with a passage for insertion of the upper extremity of the spring 245, and the bushing 241 is provided with adjustment holes 242 for the purpose of receiving a lock screw 242'. In this way, spring tension of the spring 245 can be adjusted by rotating the bushing 241 in either direction with respect to the pivot shaft 264 until the tension on the spring 245 is either lessened or increased to the desired degree, after which the set screw 242' may be tightened to fix the bushing on the pivot shaft 264. The vertical pivot shaft 264 is further supported by a lower annular collar 243 secured to the lower end of the shaft 264 and resting on the upper surface of the bracket arm 240.

A coil spring 245 surrounds the pivot shaft 264 and has one end 247 received in a bore in the shaft 264. The other end 249 of the coil spring 245 is positioned against the edge of the upper bracket arm 238 of bracket 230.

The lower end of vertical shaft 264 is rigidly attached to bracket 260 for supporting that bracket for rotation about the vertical axis of shaft 264. The bracket 260 and the horizontal pivot pin 266 in turn support the arm support bracket 262 for pivotal movement about a horizontal axis. Referring to FIG. 8, the bracket 260 includes a horizontal bight portion 294 connected to the pivot shaft 264 and a pair of bracket arms 296 extending generally downwardly from the bight portion 294. The bracket arms 296 include aligned bores therethrough for supporting pivot pin 266.

The arm support bracket 262 includes lever arm 202 and a pair of side walls 204 and 206, the side walls 204 and 206 positioned in adjacent generally mutually parallel relation with respective side walls 296. The side walls 204 and 206 include aligned bores for receiving the pivot pin 266.

A coil or torsion spring 218 surrounds the pivot pin 266 and includes one end 219 thereof positioned in a longitudinal slot 221 in the end of pivot pin 266. The other end of the coil spring 218 includes a radially projecting arm 223 engaging the bight portion 294 of bracket member 260. Again, if it is desired to regulate spring tension, the spring mounting of FIG. 7 may be employed by positioning the extremity 223 of the spring 218 in a reduced sleeve extension of a bushing on the end of the shaft 266 and selectively increasing or reducing the tension by rotation of the bushing as described with reference to the bushing 241.

The retractable supporting arm 220 is rigidly connected at one of its ends to the lever arm 202 of the arm support bracket 262 and extends generally perpendicular to the lever arm 202. The arm 220 is comprised of an elongated rod 203 surrounded by an elastomeric tube 205. One end of the elongated rod 203 is attached to the lever arm 202 of arm support bracket 262 by a bolt 207, extending through a bore 209 in the lever arm 202 and threadably received in a threaded central longitudinally extending bore 211 in the end of rod 203. The opposite end of rod 220 supports a circular plate or washer 213 attached to the rod 203 by a bolt 215. The support arm 220 also supports three linked rings 217, 219 and 221, the link 217 surrounding the support arm 220, and link 221 supported by link 219 and link 217 and in turn supporting the milk line 18.

The chain 24 is attached at one end to the milking unit 12 and the chain extends through a chain guide 54 supported in a bore 261 in the free end of the bracket arm 204 of bracket 230, and is reeved over the pulley 50 attached to the end of a piston rod 46. The other end of the chain 24 extends through a bore 263 in the bracket arm 240 and is attached to the bracket arm 202 of the arm support bracket 262.

In operation, actuation of the fluid motor 26 to cause upward movement of the piston rod 46 causes retraction of the chain 24 thereby pulling the milking unit 12 away from the cow and upwardly. Near the end of the retraction cycle a stop member 130 attached to the chain 24 will engage the chain guide 54 and further upward movement of the piston rod 46 will cause chain 24 to pull upwardly on the lever arm 202 of the bracket 262, and the milking unit support arm 220 will pivot downwardly to its vertical position shown in phantom in FIG. 7.

The coil spring 218 surrounding the horizontal pivot shaft 266 is functional to urge the milking unit support arm 220 to its outwardly or generally horizontally extending position shown in solid lines in FIG. 7, the arm being limited in its movement by a stop 263 which engages the undersurface of the bracket 260. Accordingly, at the beginning of the operating cycle wherein the operator actuates fluid motor 26 to permit extension of the chain 24, the milking unit support arm will automatically swing from its downwardly extending position to its outwardly extending position wherein it can support the milk line 18 attached to a milking unit 12 beneath a cow. The milk line can be properly positioned under the center of the cow by moving the ring 217 along the support arm 220. The ring 217 will be releasably restrained in the desired position on the support arm since it rests on the elastomeric tube 205 of the support arm 220. If it is desired to apply a forward tension on the milk line 18 to properly position the claw 14, the operator can pivot the arm 220 rearwardly about the axis of the vertical pivot shaft 264 and slide the milk line 18 through the link 221. When the arm 220 is pivoted rearwardly, the coil spring 245 surrounding the vertical pivot shaft 264 will apply a torque on pivot shaft 264 biasing the arm 220 forwardly. Since milk lines such as milk line 18 are generally comprised of an elastomeric material, the milk line 18 is not freely slidable in the link 221, and accordingly the arm 220 and links 217, 219 and 221 will tend to pull the milk line forwardly.

Another alternative embodiment of the support assembly for the milking unit support arm is shown in FIG. 9, which device is constructed in a manner similar to that shown in FIG. 7, but means are provided to facilitate manual movement of the milking unit support arm 220 between its outwardly extending position and its downwardly extending position, and a manually operable releasable latch mechanism is provided to releasably hold the support arm in its downwardly extending position. The components of the construction shown in FIG. 9 which are similar to the construction shown in FIGS. 7 and 8 are identified with the same reference numerals.

More specifically, a support bracket 362 is provided for supporting the support arm 220. The alternative support bracket 362 includes a pivotal lever arm 302 having opposite ends, one of the opposite ends supported for pivotal movement about the horizontal axis of the pivot pin 266 and the other end supporting a latching arm 304. The lever arm 302 supports the milking unit support arm 220 intermediate its opposite ends.

The bracket arm 240 of the bracket 230 includes a vertical bore 306 housing a vertically extending latch pin 308. The latch pin 308 includes an end extending downwardly through the bore 306 in the bracket arm 240 and intended to releasably engage an end of the latching arm 304 when the support arm 220 is in its downwardly extending retracted position as shown in FIG. 9, and to thereby releasably maintain the support arm in its retracted position. The latch pin 308 includes an annular flange 312 surrounding its upper end and is biased downwardly toward the position wherein it engages the latching arm 304 by a coil spring 310 surrounding the latch pin and having an upper end secured to the annular flange 312 and a lower end secured to the bracket arm 240.

In order to facilitate release of the latching arm 304 by the latch pin 308 to permit movement of the milking unit support arm 220 from its downwardly extending position to its outwardly extending position, means are provided to cause upward movement of the latch pin 308 to thereby release the latching arm 304. More specifically a lever 314 is supported by the bracket arm 240 for pivotal movement about a pivot pin 320, the lever 314 including a lever arm 318 intended to be manually depressed by an operator and a latch engaging lever arm 318 having an end received beneath the annular flange 312 of the latch pin 308 and functional to cause upward movement of the latch pin 308 when the lever arm 318 is pushed downwardly.

In operation, to facilitate movement of the milking unit support arm from the downward position to an outwardly extending milking unit supporting position, the lever arm 318 is depressed thereby causing upward movement of the latch pin 308 to release the latching arm 304. The coil spring 218 surrounding the pivot shaft 266 and urging the support arm 220 toward its outwardly extending milking unit supporting position can then cause the support arm 220 to swing outwardly and upwardly to the desired supporting position. At the completion of the milking cycle, the operator can manually swing the support arm 220 downwardly as to cause the latching arm 304 to swing upwardly. The end of latching arm 304 will engage the inclined surface 322 of the end of latch pin 308 causing latch pin 308 to return to the latched position shown in FIG. 9 and then the latch pin 308 will be returned to its downward position under the influence of coil spring 310.

What is claimed is:

1. A milking unit support and detacher mechanism for supporting a milking unit when the milking unit is attached to a cow for milking, said milking unit having a teat cup assembly and at least one hose member extending from said assembly, the milking unit support and detacher mechanism comprising:
   a milking unit support arm movable between a first position wherein said arm extends downwardly and a second position wherein said arm extends outwardly, said milking unit support arm having a free end engageable with said hose member in spaced relation to said teat cup assembly for supporting said milking unit when the milking unit is attached to a cow for milking and when said arm is in said second position; and
   support means for said milking unit support arm including first means disposed for rotation about a vertical axis and second means disposed for pivotal movement about a generally horizontal axis, and said milking unit support arm attached to one of said first and second means for movement about said vertical axis and said horizontal axis.

2. A milking unit support and detacher mechanism as set forth in claim 1, wherein said support means for supporting said milking unit support arm includes means for biasing said milking unit support arm toward said second position.

3. The milking unit support and detacher mechanism set forth in claim 2 wherein said biasing means is a spring.

4. A milking unit support and detacher mechanism as set forth in claim 1 wherein said support means for supporting said support arm includes means for supporting said support arm for pivotal movement about a vertical axis wherein said free end of said support arm for supporting the milking unit is movable from a rearward position to a forward position away from the milking unit, and said first means includes a bracket for supporting said support arm for pivotal movement about a horizontal axis.

5. The milking unit support and detacher mechanism set forth in claim 4 wherein said support means for supporting said support arm further includes means for biasing said end of said support arm forwardly when said end of said support arm is in said rearward position.

6. The milking unit support and detacher mechanism set forth in claim 1 wherein said means for supporting said milking unit support arm includes a bracket supported for pivotal movement about a horizontal axis, said support arm attached to said bracket and movable in an arcuate path from said first position to said second position during pivotal movement of said bracket about said horizontal axis.

7. The milking support and detacher mechanism set forth in claim 1 and wherein said first means includes a vertical shaft having a vertical axis, a first bracket supported by said vertical shaft for rotation about said vertical axis, a generally horizontal pivot shaft supported by said first bracket and having a generally horizontal axis, and said second means includes a second bracket supported by said horizontal shaft for pivotal movement about said generally horizontal axis, and said milking unit support arm is attached to one of said brackets for movement about said vertical axis and said horizontal axis.

8. A milking unit support and detacher mechanism for supporting a milking unit when the milking unit is attached to a cow for milking and retracting the milking unit away from the cow at the completion of the milking cycle, said milking unit having a teat cup assembly and at least one flexible hose member extending from said assembly, the milking unit support and detacher mechanism comprising:
   a milking unit support arm movable between a first position wherein said arm extends downwardly and a second position wherein said arm inclines downwardly and outwardly toward said milking unit support arm having an end engageable with said hose member in adjacent but spaced relation to said teat cup assembly for supporting said milking unit when said milking unit is attached to a cow for milking and when said arm is in said second position,
   pivotal support means for supporting said milking unit support arm for movement between said first position and said second position, and
   means for retracting said milking unit and for moving said milking unit support arm from said second position to said first position including a flexible retracting member having a first connecting portion connected to said teat cup assembly and a second connecting portion connected to said pivotal support means, and means for pulling said flexible retracting member whereby to simultaneously retract said milking unit and move said support arm from said second position to said first position.

9. A milking unit support and detacher mechanism as set forth in claim 8 wherein said means for supporting said milking unit support arm includes means for biasing said milking unit support arm toward said second position, said end of said milking unit support arm including means to wedgingly receive said hose member.

10. The milking unit support and detacher mechanism set forth in claim 9 wherein said biasing means is a spring.

11. A milking unit support and detacher mechanism as set forth in claim 8 wherein said means for supporting said support arm includes means for supporting said support arm for pivotal movement about a vertical axis wherein said end of said support arm for supporting said milking unit is movable from a rearward position to a forward position away from said milking unit, and includes means for supporting said support arm for pivotal movement about a horizontal axis.

12. The milking unit support and detacher mechanism set forth in claim 11 wherein said means for supporting said support arms includes means for biasing said end of said support arm forwardly when said end of said support arm is in said rearward position.

13. The milking unit support and detacher mechanism set forth in claim 8 wherein said means for supporting said milking unit support arm includes a bracket supported for pivotal movement about a horizontal axis, said support arm attached to said bracket and movable in an arcuate path from said first position to said second position during pivotal movement of said bracket about said horizontal axis.

14. The milking unit support and detacher mechanism set forth in claim 13 further including a lever arm having opposite ends, one of said lever arm ends attached to said bracket, and means attached to said flexible retracting member for engaging the other of said ends of said lever arm when said flexible retracting member is retracted and for pivoting said lever arm and said bracket so as to move said arm to said first position.

15. The milking unit support and detacher mechanism as set forth in claim 8 and wherein said means for supporting said milking unit support arm includes, a vertical shaft having a vertical axis, a first bracket supported by said vertical shaft for rotation about said vertical axis, a generally horizontal pivot shaft supported by said first bracket and having a generally horizontal axis, and a second bracket supported by said horizontal shaft for pivotal movement about said generally horizontal axis, and said milking unit support arm is attached to one of said brackets for movement about said vertical axis and said horizontal axis.

16. The milking unit support and detacher mechanism set forth in claim 15 and further including a lever arm having opposite ends, one of said lever arm ends attached to said second bracket, and means attached to said flexible member for engaging the other of the ends of the lever arm when said flexible member is retracted for pivoting said lever arm and said second bracket so as to move said arm to said first position.

17. The milking unit support and detacher apparatus set forth in claim 15 and wherein said means for supporting said support arm includes spring means for biasing said support arm toward said second position.

18. The milking unit support and detacher mechanism set forth in claim 8 wherein said means for pulling on said flexible retracting member includes a fluid motor having a vertically movable piston, and means for connecting said piston to said flexible retracting member.

* * * * *